United States Patent
Zheng et al.

(10) Patent No.: US 8,693,333 B2
(45) Date of Patent: Apr. 8, 2014

(54) METHOD, NETWORK NODE AND SYSTEM FOR SUPPRESSING LOST PACKET RETRANSMISSION

(75) Inventors: Hewen Zheng, Nanjing (CN); Yinliang Hu, Nanjing (CN); Peilin Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 439 days.

(21) Appl. No.: 13/097,382

(22) Filed: Apr. 29, 2011

(65) Prior Publication Data

US 2011/0199907 A1     Aug. 18, 2011

Related U.S. Application Data

(63) Continuation of application No. PCT/CN2009/072951, filed on Jul. 28, 2009.

(30) Foreign Application Priority Data

Oct. 31, 2008 (CN) .......................... 2008 1 0172356
Mar. 18, 2009 (CN) .......................... 2009 1 0127718

(51) Int. Cl.
 *H04L 12/26*     (2006.01)
(52) U.S. Cl.
 USPC .......................................... 370/235; 370/252
(58) Field of Classification Search
 None
 See application file for complete search history.

(56) References Cited

U.S. PATENT DOCUMENTS

| | | | |
|---|---|---|---|
| 7,180,896 B1 * | 2/2007 | Okumura | 370/394 |
| 2003/0031203 A1 | 2/2003 | Fukui | |
| 2003/0043777 A1 | 3/2003 | Koponen et al. | |
| 2004/0258070 A1 | 12/2004 | Arima | |
| 2007/0162810 A1 * | 7/2007 | Sato et al. | 714/748 |
| 2007/0260921 A1 | 11/2007 | Cankaya et al. | |
| 2008/0080369 A1 * | 4/2008 | Sumioka et al. | 370/229 |

(Continued)

FOREIGN PATENT DOCUMENTS

| | | |
|---|---|---|
| CN | 1416659 A | 5/2003 |
| CN | 1917639 A | 2/2007 |

(Continued)

OTHER PUBLICATIONS

European Patent Office Communication re the extended European search report, pursuant to 62 EPC, the supplemental European search report (Art. 153(7) EPC) and the European search opinion issued in related Application No. 09823017.0-1237; dated (mailed) Jun. 11, 2012.

(Continued)

*Primary Examiner* — Chi Pham
*Assistant Examiner* — Raul Rivas
(74) *Attorney, Agent, or Firm* — Brinks Gilson & Lione

(57) ABSTRACT

A method, a network node, and a system for suppressing lost packet retransmission are provided. The method includes: generating retransmission suppression information, in which the retransmission suppression information includes identification information of data packets requiring retransmission suppression; and transmitting the retransmission suppression information to a receiving node, in which the retransmission suppression information is used to enable the receiving node not to request retransmission when data packets corresponding to the identification information in the retransmission suppression information are lost after the receiving node receives the retransmission suppression information. The network node includes a generating module and a transmitting module. The system includes an intermediate node and a receiving node.

18 Claims, 5 Drawing Sheets

(56) References Cited

U.S. PATENT DOCUMENTS

| | | | |
|---|---|---|---|
| 2008/0172708 A1 | 7/2008 | Perry et al. | |
| 2008/0253369 A1 | 10/2008 | Oran et al. | |
| 2008/0259961 A1 | 10/2008 | Wiemann et al. | |
| 2010/0246390 A1* | 9/2010 | Wu et al. | 370/230 |
| 2010/0260180 A1* | 10/2010 | Wu et al. | 370/390 |

FOREIGN PATENT DOCUMENTS

| | | |
|---|---|---|
| CN | 101114982 | 1/2008 |
| CN | 101114982 A | 1/2008 |
| CN | 101189840 | 5/2008 |
| CN | 1011189840 A | 5/2008 |
| WO | WO 2004/042953 A1 | 5/2004 |
| WO | WO 2008/106823 A1 | 9/2008 |
| WO | WO 2010/048825 A1 | 5/2010 |

OTHER PUBLICATIONS

Zhou, Shu Min et al.; "Partial Retransmission Based on Minimal Bandwidth-Distortion Cost in Error Prone Video Delivery"; Chinese Journal of Computers vol. 30, No. 2, Feb. 2007 (13 pgs.).
Office Action issued in corresponding Chinese Patent Application No. 200910127718.6, mailed Mar. 1, 2013.
Zhou et al., Partial Retransmission Based on Minimal Bandwidth-Distortion Cost in Error Prone Video Delivery, Chinese Journal of Computers, Feb. 2007, vol. 30, No. 2 pp. 212-224 (13 pgs.).
International Search Report for International Application No. PCT/CN2009/072951 mailed Nov. 5, 2009 Huawei Technologies Co., Ltd. (4 pgs.).
Written Opinion of the International Searching Authority (translation) dated (mailed) Nov. 5, 2009, issued in related Application No. PCT/CN2009/072951, filed Jul. 28, 2009, Huawei Technologies Co., Ltd. (3 pgs.).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|  FMT   |      PT       |          length               |
+-+-+-+-+-+-+-+-+-+-+-+-+-+-+-+-+-+-+-+-+-+-+-+-+-+-+-+-+-+-+-+-+
|                    SSRC of packet sender                      |
+-+-+-+-+-+-+-+-+-+-+-+-+-+-+-+-+-+-+-+-+-+-+-+-+-+-+-+-+-+-+-+-+
|                    SSRC of media source                       |
+-+-+-+-+-+-+-+-+-+-+-+-+-+-+-+-+-+-+-+-+-+-+-+-+-+-+-+-+-+-+-+-+
|     Type      |              Reserved                         |
+-+-+-+-+-+-+-+-+-+-+-+-+-+-+-+-+-+-+-+-+-+-+-+-+-+-+-+-+-+-+-+-+
|  The Start Sequence Number   |   The End Sequence Number     |
+-+-+-+-+-+-+-+-+-+-+-+-+-+-+-+-+-+-+-+-+-+-+-+-+-+-+-+-+-+-+-+-+
```

FIG. 7

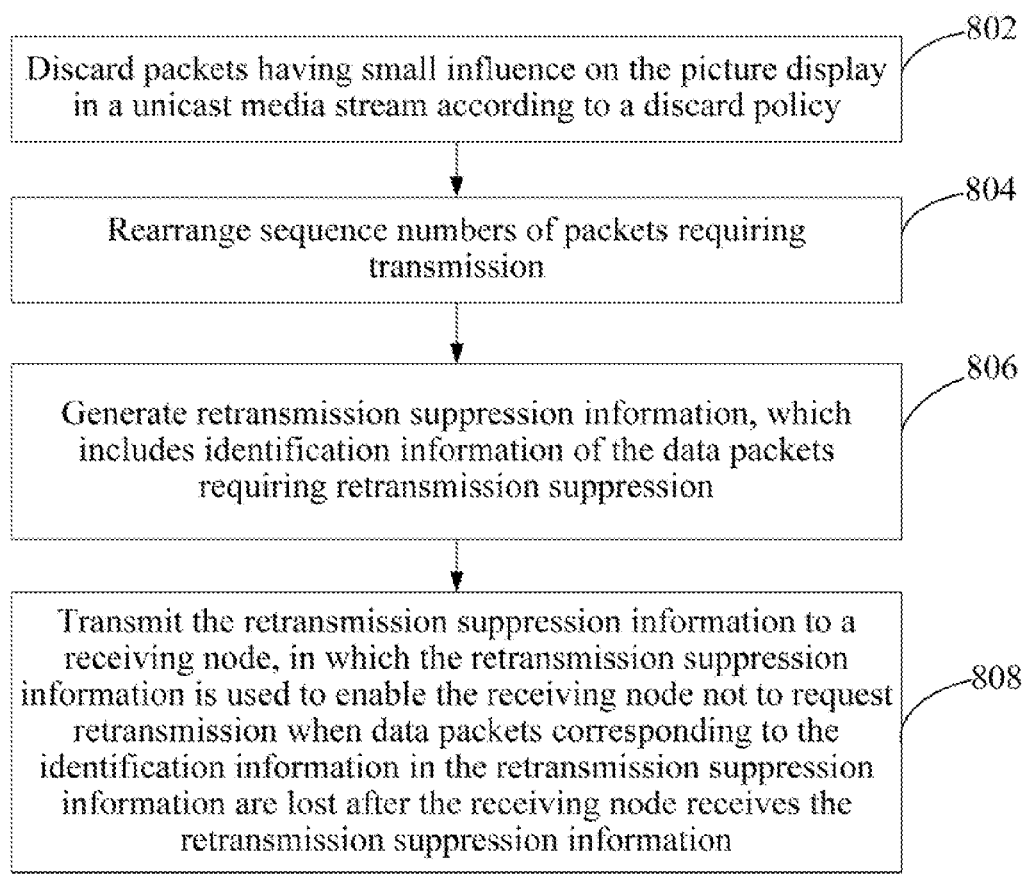

METHOD, NETWORK NODE AND SYSTEM FOR SUPPRESSING LOST PACKET RETRANSMISSION

CROSS-REFERENCE TO RELATED APPLICATIONS

This application is a continuation of International Application No. PCT/CN2009/072951, filed on Jul. 28, 2009, which claims priority to Chinese Patent Application No. 200810172356.8, filed on Oct. 31, 2008 and Chinese Patent Application No. 200910127718.6, filed on Mar. 18, 2009, all of which are hereby incorporated by reference in their entireties.

FIELD OF THE INVENTION

The present invention relates to the field of communications technologies, and in particular, to a method, a network node and a system for suppressing lost packet retransmission.

BACKGROUND OF THE INVENTION

With the fast development of network technologies and diversified network communication services, the number of subscribers is continuously increasing, which requires higher network bandwidth. The current network bandwidth fails to meet the requirements of the subscribers, and therefore, network congestion inevitably occurs.

When the network congestion occurs, a network device discards a part of data packets according to a certain packet discard policy. The current packet discard policies include a tail drop policy and an intelligent packet discard policy. The tail drop policy is to discard new-arrival data packets directly without considering the priority difference of the data packets when a buffer queue is fully occupied. The intelligent packet discard policy is an improvement to the tail drop policy, which is based on the perception of the services, and selectively discards some data packets that are not important or are with low priorities. For example, in the video transmission field, B-frame data packets are preferentially discarded because this type of data packets has small influence on the display of the entire image, and I-frame or P-frame data packets are not discarded if possible, thereby bringing better visual experience for a terminal user.

However, the packets discarded according to the intelligent packet discard policy are also lost packets for a receiving end. According to current transport protocols such as a Real-time Transport Protocol/RTP Control Protocol (RTP/RTCP), the receiving end requests a transmitting end to retransmit lost packets once the packet loss occurs. The retransmitted data packets cause delay, increase the processing load on the transmitting end, and occupy a great deal of link bandwidth, thereby leading to further network congestion.

SUMMARY OF THE INVENTION

In order to reduce a network burden and avoid aggravation of network congestion, embodiments of the present invention provide a method, a network node and a system for suppressing lost packet retransmission. The technical solutions are described in the following.

A method for suppressing lost packet retransmission includes:

generating retransmission suppression information, in which the retransmission suppression information includes identification information of data packets requiring retransmission suppression; and transmitting the retransmission suppression information to a receiving node, in which the retransmission suppression information is used to enable the receiving node not to request retransmission when data packets corresponding to the identification information in the retransmission suppression information are lost after the receiving node receives the retransmission suppression information.

A network node includes:

a generating module, configured to generate retransmission suppression information, in which the retransmission suppression information includes identification information of data packets requiring retransmission suppression; and a transmitting module, configured to transmit the retransmission suppression information generated by the generating module to a receiving node, in which the retransmission suppression information is used to enable the receiving node not to request retransmission when data packets corresponding to the identification information in the retransmission suppression information are lost after the receiving node receives the retransmission suppression information.

A system for suppressing lost packet retransmission includes: an intermediate node and a receiving node, where the intermediate node is configured to generate retransmission suppression information and transmit the retransmission suppression information to the receiving node, in which the retransmission suppression information includes identification information of data packets requiring retransmission suppression; and the receiving node is configured to receive the retransmission suppression information transmitted from the intermediate node, and not to request retransmission when the data packets corresponding to the identification information in the retransmission suppression information are lost.

The technical solutions provided in the embodiments of the present invention have the following beneficial effects:

By generating and transmitting the retransmission suppression information, the receiving node does not request retransmission when the data packets requiring retransmission suppression are lost, thereby reducing the network burden, and avoiding the aggravation of the network congestion.

BRIEF DESCRIPTION OF THE DRAWINGS

FIG. 7 is a schematic diagram of an extension manner of an extended RTCP packet according to another embodiment of the present invention;

FIG. 8 is a flow chart of a method for suppressing lost packet retransmission according to another embodiment of the present invention;

DETAILED DESCRIPTION OF THE EMBODIMENTS

In order to make the objectives, technical solutions, and advantages of the present invention more comprehensible, the present invention is described in further detail below with reference to embodiments and the accompanying drawings.

After a network device preferentially discards some data packets with low priorities according to an intelligent packet discard policy when network congestion occurs, in order to prevent further congestion because a receiving end requests retransmission due to packet discard, a method for suppressing retransmission after the intelligent packet discard processing of the network device needs to be provided.

Figure 1:
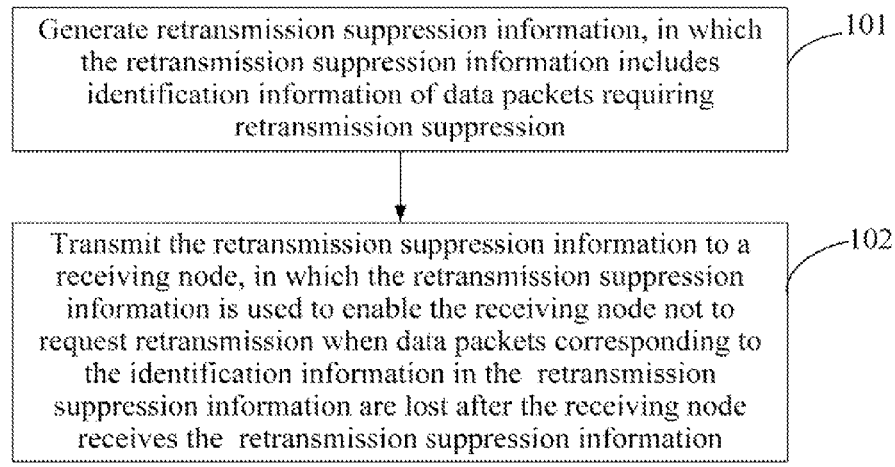
FIG. 1 is a flow chart of a method for suppressing lost packet retransmission according to an embodiment of the present invention.

Referring to FIG. 1, an embodiment of the present invention provides a method for suppressing lost packet retransmission, where the method includes the following steps.

Step 101: Generate retransmission suppression information in which the retransmission suppression information includes identification information of data packets requiring retransmission suppression.

Step 102: Transmit the retransmission suppression information to a receiving node, in which the retransmission suppression information is used to enable the receiving node not to request retransmission when data packets corresponding to the identification information in the retransmission suppression information are lost after the receiving node receives the retransmission suppression information.

According to the method for suppressing lost packet retransmission provided in this embodiment, the retransmission suppression information is generated and transmitted, so that the receiving node does not request retransmission when the data packets requiring retransmission suppression are lost, thereby reducing the network burden and avoiding the aggravation of the network congestion.

Figure 2:
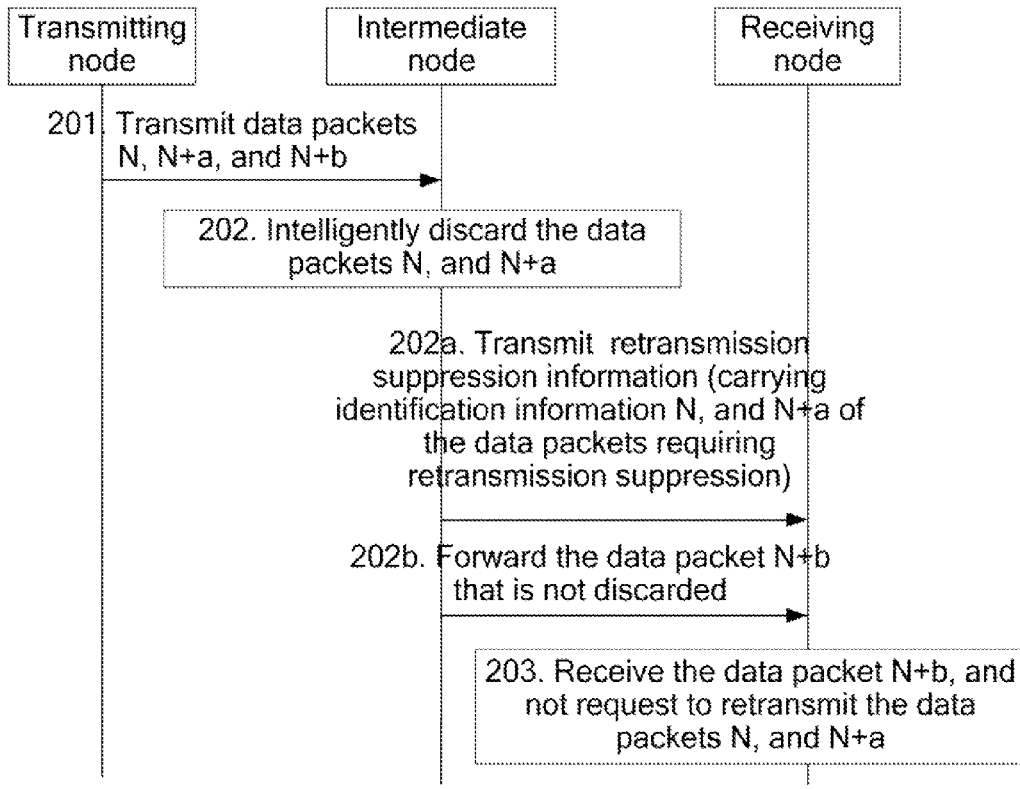
FIG. 2 is an interaction diagram of a method for suppressing lost packet retransmission according to an embodiment of the present invention.

Referring to FIG. 2, the implementation of suppressing lost packet retransmission is described in detail with reference to the interaction flow chart.

Step 201: A transmitting node transmits data packets to an intermediate node.

The data packet may be one or more, and may be a data packet in any format, such as an RTP data packet and an Internet Protocol (IP) data packet. In addition, an identification of the data packet may have various forms according to different formats of the data packet, such as an RTP sequence number.

Specifically, for example, a data packet N, a data packet N+a, and a data packet N+b are transmitted in this step, in which N, N+a, and N+b are respectively identification information of the corresponding data packets.

Step 202: The intermediate node receives the data packets transmitted from the transmitting node, and discards a part of the data packets according to a preset packet discard policy when congestion occurs. For example, the data packets N and N+a are discarded, and retransmission suppression information of the data packets requiring retransmission suppression is generated. Afterwards, Steps 202a) and 202b) are performed.

Step 202a: Transmit the retransmission suppression information to a receiving node, in which, the retransmission suppression information includes identification information of the data packets requiring retransmission suppression, such as N, and N+a; additionally, the retransmission suppression information may also include the information such as the number of the data packets.

Step 202b): Forward the data packet that is not discarded, such as the data packet N+b, to the receiving node.

Further, the retransmission suppression information of the data packets requiring retransmission suppression is generated, which specifically includes the following steps:

Determine the importance of the discarded data packets according to information such as the priorities of the discarded data packets;

If the discarded data packets are data packets with low priorities, the data packets requiring retransmission suppression are the discarded data packets, and correspondingly, the retransmission suppression information thereof includes the identification information of the discarded data packets, and may also include the information such as the number of the discarded data packets; and If the congestion is still not solved by discarding only the data packets with the low priority, it is required to discard a part of the data packets with high priority. At this time, the retransmission suppression information only includes the information such as the identification information of the data packets with the low priority, and the discarded data packets with the high priority still need to be retransmitted.

In this embodiment, the intelligent packet discard policy is taken as an example to describe the process of retransmission suppression. A non-intelligent packet discard policy, such as a tail drop policy, may also apply the method for suppressing retransmission provided in this embodiment, and the process thereof is the same as the process of the intelligent packet discard policy, which will be not described herein again.

Step 203: After receiving the retransmission suppression information, the receiving node determines whether the lost packets are the data packets requiring retransmission suppression designated in the retransmission suppression information; if the lost packets are the data packets requiring retransmission suppression designated in the retransmission suppression information, the receiving node does not request retransmission for this part of the data packets, such as data packets N and N+a; if the lost packets are not the data packets requiring retransmission suppression designated in the retransmission suppression information, the receiving node requests the retransmission.

The process of suppressing the receiving node to request lost packet retransmission is implemented through steps 201 to 203. The node involved in this embodiment may be any network device. In addition, in step 202a), the retransmission suppression information may be transmitted to the receiving node in different manners according to the actual application condition, which are specifically described in the following:

1. The intermediate node transmits the retransmission suppression information to the receiving node through a retransmission suppression message. Specifically, the retransmission suppression message carries the identification information of the data packets requiring retransmission suppression, and the retransmission suppression message is transmitted to the receiving node.

2. The intermediate node carries the retransmission suppression information in the next data packet normally transmitted to the receiving node to transmit the retransmission suppression information to the receiving node. Specifically, options of the data packet normally transmitted to the receiving node are extended, that is, a retransmission suppression field is added, and the retransmission suppression information is written into the retransmission suppression field.

For example, the intermediate node extends the options of the RTP data packet, and the retransmission suppression field is inserted into header extension of the RTP, in which the field stores the sequence numbers of the RTP data packets requiring retransmission suppression, and may also store the number of the RTP data packets requiring retransmission suppression if necessary. The receiving node checks the retransmission suppression field in the header extension of the RTP data packet after receiving the RTP data packet, and does not request retransmission for the data packets corresponding to the retransmission suppression information stored in the field.

3. The intermediate node carries the retransmission suppression information in the data packets requiring retransmission suppression to transmit the retransmission suppression information to the receiving node. Specifically, the payload of the data packets requiring retransmission suppression is deleted, the type of the data packets requiring retransmission suppression is set to a retransmission suppression type, the data packets requiring retransmission suppression after modification are transmitted to the receiving node, and the receiving node does not request retransmission if the receiving node detects that the received data packets are of the retransmission suppression type.

For example, the intermediate node deletes the payload of the RTP data packet, and meanwhile a Payload Type (PT) field in the RTP fixed header is modified into the retransmission suppression type, and then the RTP data packet is transmitted to the receiving node. The receiving node does not request retransmission after receiving the RTP data packet.

4. The intermediate node carries the retransmission suppression information in a report packet to transmit the retransmission suppression information to the receiving node. Specifically, options of the report packet are extended, that is, a retransmission suppression field is added, and the retransmission suppression information is written into the retransmission suppression field.

Further, the report packet is used to inform a transmitting end or a receiving end of the transmission condition of the data packets, and the report packet may be transmitted by the intermediate node or the transmitting node. As for the report packet transmitted by the transmitting node, the options of the report packet are extended by using the intermediate node, and then the report packet is transmitted to the receiving node. In addition, the report packet transmitted by the intermediate node may be periodically transmitted, or be immediately transmitted every time when one data packet requiring retransmission suppression is discarded.

For example, an RTCP Sender Report (SR) packet is used to report the transmission condition of the RTP data packets, the intermediate node extends the options of the RTCP SR packet, and the retransmission suppression field is added in the extended options, in which the field stores the sequence numbers of the RTP data packets requiring retransmission suppression, and may also store the number of the RTP data packets requiring retransmission suppression if necessary. The receiving node checks the retransmission suppression field after receiving the RTCP SR packet, and does not request retransmission for the data packets corresponding to the retransmission suppression information stored in the field.

In a specific application scenario of the embodiment illustrated in FIG. 2, the suppression of the lost packet retransmission is applied in a multicast or broadcast scenario. When the intermediate node finds that a data packet is lost among the data packets received by the transmitting node, and the retransmission suppression information of the data packet is not received, the intermediate node requests the transmitting node to retransmit the data packet, and the intermediate node generates the retransmission suppression information of the data packet and transmits the retransmission suppression information to the receiving node. The intermediate node forwards the data packet to the receiving node after receiving the data packet retransmitted by the transmitting node. In this application scenario, a plurality of receiving nodes receiving the multicast or broadcast does not transmit the retransmission request for the same lost data packet at the same time, and the intermediate node requests the retransmission instead, thereby avoiding a retransmission request network storm caused by the retransmission requests of multiple users.

Figure 3:
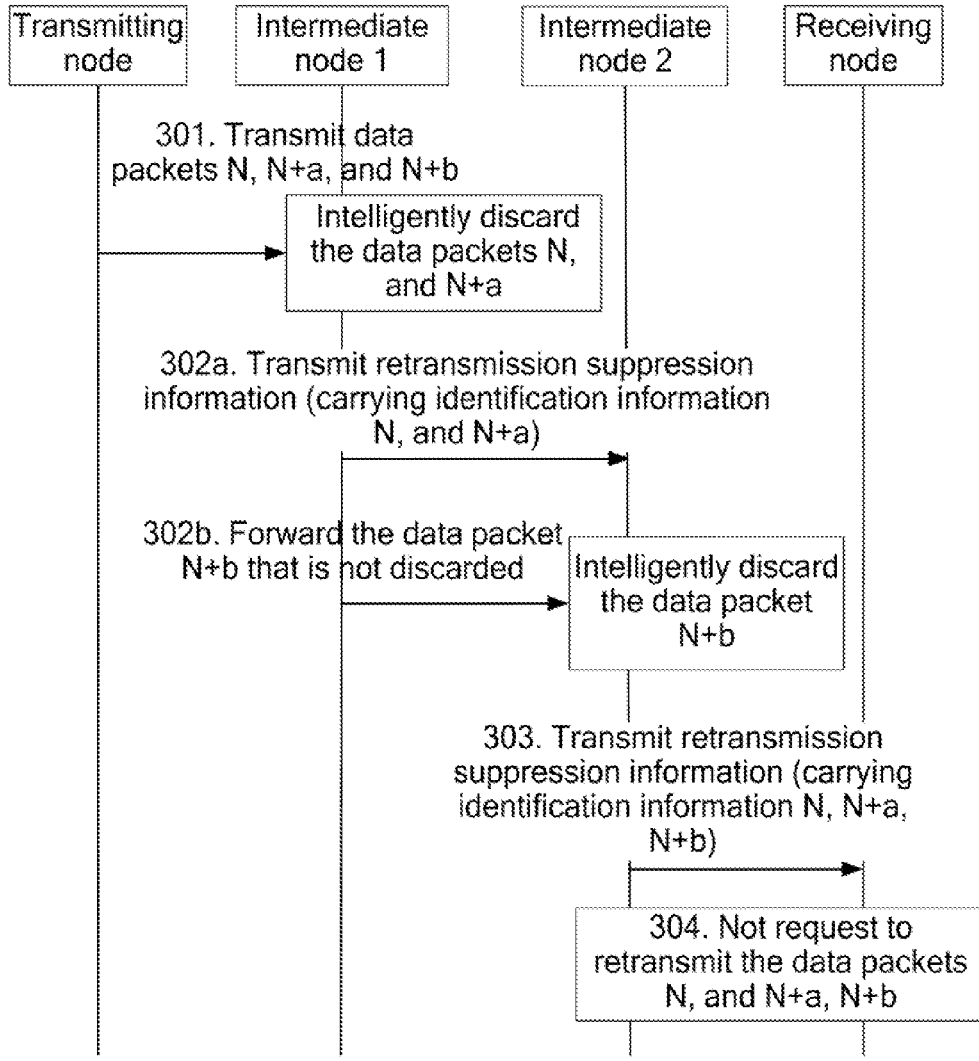
FIG. 3 is an interaction diagram of a method for suppressing lost packet retransmission of two-level intermediate nodes according to an embodiment of the present invention.

In addition, this embodiment supports a method for suppressing lost packet retransmission by using multi-level intermediate nodes, that is, the previous level intermediate node transmits the retransmission suppression information to the current level intermediate node, and then the current level intermediate node collects the information of the data packets requiring retransmission suppression in the previous level intermediate node and the information of the data packets requiring retransmission suppression thereof together to transmit the information to the next intermediate node, and so forth. Finally, the last level intermediate node transmits the final retransmission suppression information to the receiving node. Referring to FIG. 3, two-level intermediate nodes are taken as an example, and the process of suppressing lost packet retransmission includes the following steps:

Step 301: A transmitting node transmits the data packets N, N+a, and N+b to an intermediate node 1.

Step 302: The intermediate node 1 intelligently discards the data packets N and N+a, and 302a): the intermediate node 1 transmits the retransmission suppression information to an intermediate node 2, in which the information carries the identification information N, N+a of the data packets N, N+a; and then 302b): meanwhile, the data packet N+b is transmitted to the intermediate node 2.

Step 303: The intermediate node 2 receives the retransmission suppression information and the data packet N+b, intelligently discards the data packet N+b, collects the information requiring retransmission suppression together, and transmits the retransmission suppression information to the receiving node, in which the information carries the identification information N, N+a, and N+b of the data packets N, N+a, and N+b.

Step 304: The receiving node determines that the lost data packets N, N+a, and N+b are the data packets requiring retransmission suppression designated in the retransmission suppression information after receiving the retransmission suppression information, and does not request retransmission for the data packets N, N+a, and N+b.

In a specific application scenario of the embodiment illustrated in FIG. 3, the suppression of the lost packet retransmission is applied in a multicast or broadcast scenario. When the intermediate node 2 finds that a data packet is lost among the data packets received by the intermediate node 1, and the retransmission suppression information of the data packet is not received, the intermediate node 2 requests the intermediate node 1 to retransmit the data packet, generates the retransmission suppression information of the data packet, and transmits the retransmission suppression information to the receiving node. The intermediate node 2 forwards the data packet to the receiving node after receiving the data packet retransmitted by the transmitting node 1. In this application scenario, a plurality of receiving nodes receiving the multicast or broadcast does not transmit the retransmission request for the same lost data packet at the same time, and the intermediate node 2 requests the retransmission instead, thereby avoiding a retransmission-request network storm caused by the retransmission requests of multiple users.

According to the method for suppressing the lost packet retransmission provided in this embodiment, the retransmission suppression information is generated and transmitted, so that the receiving node does not request retransmission when the data packets requiring retransmission suppression are lost, thereby reducing the network burden and avoiding the aggravation of the network congestion.

Figure 4:
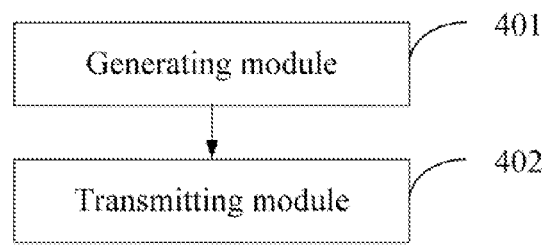
FIG. 4 is a schematic structural diagram of a network node according to an embodiment of the present invention.

Referring to FIG. 4, a network node is provided in this embodiment, which includes:

a generating module 401, configured to generate retransmission suppression information, in which the retransmission suppression information includes identification information of data packets requiring retransmission suppression; and a transmitting module 402, configured to transmit the retransmission suppression information generated by the generating module 401 to a receiving node, in which the retransmission suppression information is used to enable the receiving node not to request retransmission when data packets corresponding to the identification information in the retransmission suppression information are lost after the receiving node receives the retransmission suppression information.

Specifically, the generating module 401 is specifically configured to generate the retransmission suppression information according to priorities of the discarded data packets, use the discarded data packets with low priorities as data packets requiring retransmission suppression, in which the retransmission suppression information includes identification information of the discarded data packets with the low priorities; and the transmitting module 402 is specifically configured to carry the retransmission suppression information in a retransmission suppression message, a data packet, or a report packet to transmit to the receiving node, in which the data packet is a data packet requiring retransmission suppression or a data packet not requiring retransmission suppression.

Further, when the data packet transmitted by the transmitting module 402 is a data packet requiring retransmission suppression, payload of the data packet is deleted, and the retransmission suppression information is carried in the data packet with the payload deleted.

Further, the network node further includes:

a receiving module 403, configured to receive the retransmission suppression information transmitted from other network nodes; and a collecting module 404, configured to collect the retransmission suppression information received by the receiving module 403 and the retransmission suppression information locally generated by the network node.

The transmitting module 402 is further configured to transmit the retransmission suppression information collected by the collecting module 404 to the receiving node, in which the retransmission suppression information is used to enable the receiving node not to request retransmission when data packets corresponding to the identification information in the collected retransmission suppression information are lost after the receiving node receives the collected retransmission suppression information.

The network node in this embodiment and the intermediate node in the method embodiment are based on the same concept, and as for the specific implementation thereof, references are made to the method embodiment, which will not be described herein again.

According to the network node provided in this embodiment, by generating and transmitting the retransmission suppression information, the receiving node is enabled not to request retransmission when the data packets requiring retransmission suppression are lost, thereby reducing the network burden, and avoiding the aggravation of network congestion.

Figure 5:
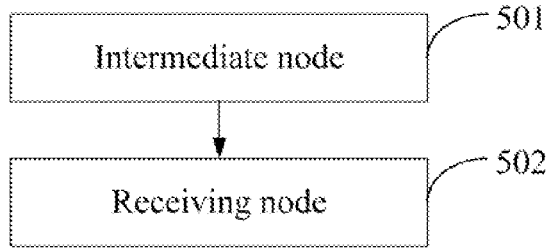
FIG. 5 is a schematic structural diagram of a system for suppressing lost packet retransmission according to an embodiment of the present invention.

Referring to FIG. 5, a system for suppressing lost packet retransmission is provided in this embodiment, which includes an intermediate node 501 and a receiving node 502.

The intermediate node 501 is configured to generate retransmission suppression information and transmit the retransmission suppression information to the receiving node 502, in which the retransmission suppression information includes identification information of data packets requiring retransmission suppression.

The receiving node 502 is configured to receive the retransmission suppression information transmitted from the intermediate node 501, and not to request retransmission when the data packets corresponding to the identification information in the retransmission suppression information are lost.

Further, the intermediate node 501 is further configured to collect the local retransmission suppression information and the received retransmission suppression information.

The intermediate node and the receiving node involved in the system provided in this embodiment and the intermediate node and the receiving node in the method embodiment are based on the same concept, and as for the specific implementation, references are made to the method embodiment, which will be not described herein again.

According to the system in this embodiment, retransmission is not requested when the data packets requiring retransmission suppression are lost, thereby reducing the network burden, and avoiding the aggravation of the network congestion.

Another embodiment of the present invention is described in the following with reference to FIG. 6 and FIG. 7. In another embodiment of the present invention, the method for suppressing lost packet retransmission is specifically applied in retransmission suppression of fast channel change.

In the Internet Protocol Television (IPTV) and Multimedia Broadcast Multicast Service (MBMS) technologies, fast channel change needs to be performed.

An intermediate node receives a media stream transmitted from a transmitting node, and then the media stream is forwarded to a receiving node. As for streaming media coding, a frame sequence of the media stream received by the intermediate node is composed by a Group of Pictures (GOP), and the GOP includes an Intra frame (I frame), a prediction frame (P frame) and a Bidirectional prediction frame (B frame), in which the I frame is a complete picture, and the P frame and B frame record the changes with respect to the I frame.

When the receiving node requests the fast channel change when receiving the B frame or the P frame, if the intermediate node pushes the media stream to the receiving node directly from the B frame or the P frame, the receiving node can display the picture only after receiving the I frame of the next GOP. Therefore, according to different time for the receiving node to request the fast channel change, the wait time for picture display is also different, which sometimes is up to 4 to 5 seconds or even longer.

In order to speed up the picture display, the intermediate node needs to push a unicast media stream to the receiving node from the I frame of the current GOP. In this way, once the receiving node receives the packet of the I frame of the current GOP, the picture may be displayed, thereby improving the user experience. However, a large delay exists between the picture playing of the receiving node requesting the fast channel change and other receiving nodes in this case, and a larger difference may even be caused between the picture playing of the receiving nodes because of different channel change time, and meanwhile, the intermediate node has excessive burden. In order to solve this problem, ensure that the picture playing of the receiving nodes receiving the same channel is basically synchronous, and meanwhile reduce the time of transmitting the unicast media stream to the receiving node by the intermediate node, some packets having small influence on the picture display may be discarded among the packets of the media stream. For example, the B frame packets are discarded in the unit of a frame, or the packets having small influence on the picture display in the I frame, the B frame or the P frame are discarded. In this way, the time of transmitting the unicast media stream to the receiving node may be shortened.

When the packets having small influence on the picture display are discarded, the sequence numbers of the media packets are made inconsecutive. For example, the last packet sequence number of the I frame of the current GOP directly jumps to the first packet sequence number of the first P frame of the current GOP. If the packets having small influence on the picture display are respectively discarded in the I frame, the B frame or the P frame, the sequence numbers of the packets are made inconsecutive. As for the packets considered to be lost by the receiving node between the packets with inconsecutive sequence numbers, the above embodiment may be used to suppress the lost packet retransmission on the receiving node, or the embodiment described in FIG. 6 may also be used to suppress the lost packet retransmission on the receiving node.

Figure 6:
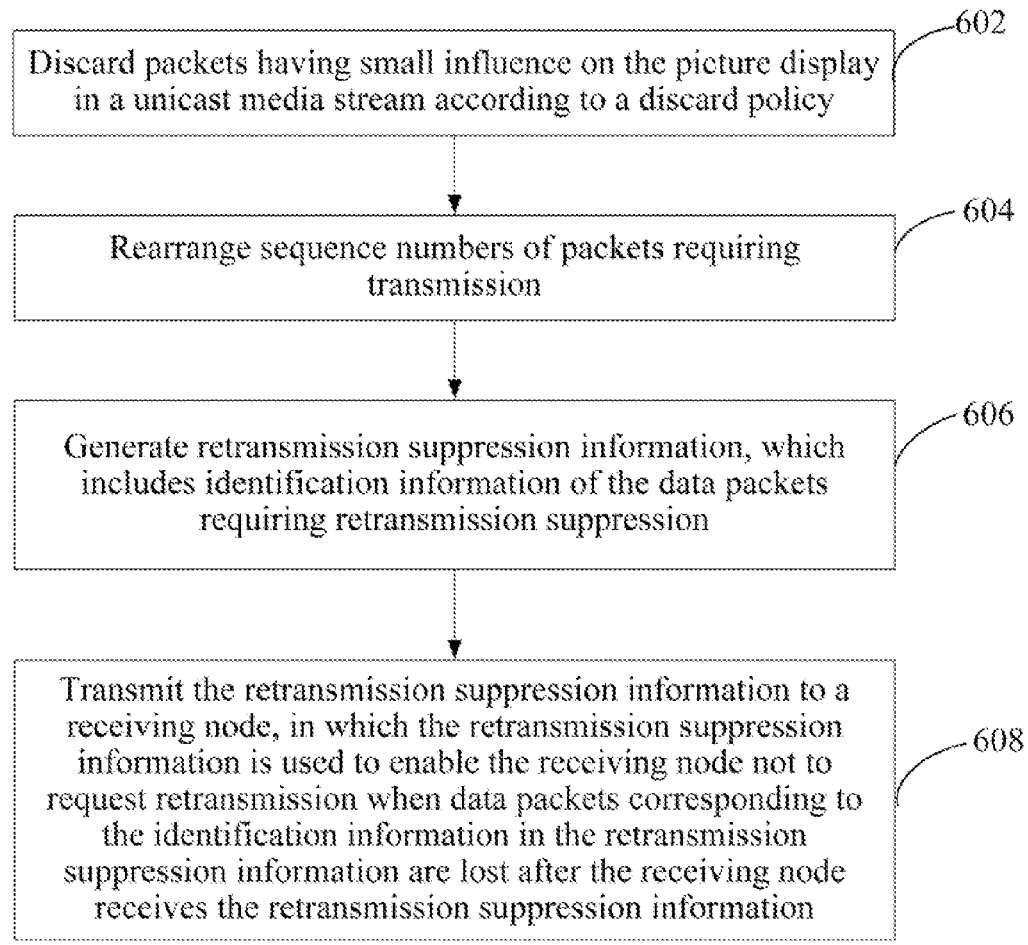
FIG. 6 is a flow chart of a method for suppressing retransmission of fast channel change according to another embodiment of the present invention.

FIG. 6 is a flow chart of a method for suppressing retransmission of fast channel change according to another embodiment of the present invention, where the method includes the following steps.

Step 602: Discard packets having small influence on the picture display in a unicast media stream according to a packet discard policy.

For example, the first packet sequence number of the I frame of the current GOP is 10000, the I frame has 80 packets, the P frame has 30 packets, the B frame has 20 packets, and in the GOP, the packets are arranged in a sequence of two B frames and one P frame. In this case, if the B frame packets having small influence on the picture display are not transmitted, about half of packet transmission may be reduced.

Step 604: Rearrange the sequence numbers of packets requiring transmission.

However, when the packets having small influence on the picture display are discarded, the packet sequence numbers may be made inconsecutive. For example, the last packet sequence number of the I frame of the current GOP is 10079, and the sequence number directly jumps to the first packet with the packet sequence number 10120 of the P frame after the packets of two B frames are discarded. If the packets having small influence on the picture display are respectively discarded in the I frame, the B frame or the P frame, more inconsecutive sequence numbers may be caused. In order to reduce the terminal request retransmission caused by the inconsecutive packet sequence numbers, the packet sequence numbers may be rearranged. When the transmission of the last packet of the I frame of the current GOP with the packet sequence number 10079 is completed, the first packet of the P frame is to be transmitted, and the packet sequence numbers in the P frame may be rearranged. For example, the original packet sequence number 10120 of the packet is rearranged into a packet sequence number 10080. Likewise, the packet sequence numbers are made consecutive. When the last packet of the last P frame of the current GOP is transmitted, the packet sequence number of the last packet and the packet sequence number of the I frame of the next GOP are inconsecutive. At this time, the packet sequence number of the I frame of the next GOP may be rearranged, and the packet sequence numbers of other frames of the next GOP are correspondingly adjusted. Alternatively, step 606 may be performed on the inconsecutive packet sequence numbers of the last packet of the last P frame of the current GOP and the I frame of the next GOP.

Step 606: Generate retransmission suppression information when it is not required to rearrange the sequence numbers of packets requiring transmission, in which the retransmission suppression information includes identification information of the data packets requiring retransmission suppression.

For example, the identification information of the data packets requiring retransmission suppression may be the inconsecutive sequence numbers in the unicast media stream after the rearrangement of the sequence numbers. If the inconsecutive packet sequence numbers appear in the unicast media stream, for example, the sequence number of the last packet of the last P frame of the previous GOP after the rearrangement and the sequence number of the packet of the I frame of the next GOP without rearrangement are inconsecutive, the retransmission suppression information may be generated, which includes the information of the section of inconsecutive packet sequence numbers, such as the first packet sequence number (the next packet sequence number of the P frame of the previous GOP) and the last packet sequence number (the previous packet sequence number of the I frame of the next GOP) of the section of the inconsecutive packet sequence numbers.

For another example, when the picture playing of the unicast media stream and the multicast media stream is basically synchronous, it is unnecessary for the intermediate node to transmit the unicast media stream to the receiving node again. Because the sequence numbers of the unicast media stream are rearranged, when the unicast media stream and the multicast media stream switch, the packet sequence numbers may be inconsecutive. At this time, the retransmission suppression information may be generated, which includes the information of the section of inconsecutive packet sequence numbers, such as the first packet sequence number (the next packet sequence number of the packet of the last unicast media stream) and the last packet sequence number (the previous packet sequence number of the first packet of the multicast media stream) of the section of the inconsecutive packet sequence numbers. In addition, the discarding of the packets in the unicast media stream may be stopped when the picture playing of the unicast media stream and the multicast media stream is basically synchronous, and the rearrangement of the packet sequence numbers may also be stopped. The first packet sequence number after the rearrangement of the packet sequence numbers is stopped and the sequence number of the packet previously transmitted may be inconsecutive. At this time, the retransmission suppression information may be generated, which includes the information of the section of the inconsecutive packet sequence numbers, such as the first packet sequence number (the next packet sequence number of the packet of the last unicast media stream before the rearrangement is stopped) and the last packet sequence number (the previous packet sequence number of the packet of the first unicast media stream after the rearrangement is stopped) of the section of the inconsecutive packet sequence numbers.

Step 608: Transmit the retransmission suppression information to a receiving node, in which the retransmission suppression information is used to enable the receiving node not to request retransmission when data packets corresponding to the identification information in the retransmission suppression information are lost after the receiving node receives the retransmission suppression information.

For example, the retransmission suppression information may be transmitted to the receiving node by using an extended RTCP packet. For example, if the inconsecutive packet sequence numbers appear in the unicast media stream, when the intermediate node transmits the first packet of the last P frame of the previous GOP, the intermediate node may determine the retransmission suppression information that needs to be generated, and the retransmission suppression information may be transmitted to the receiving node by using the extended RTCP packet at this moment or later according to the configuration.

In a specific application scenario of the embodiment illustrated in FIG. 6, before the picture playing of the unicast media stream and the multicast media stream is basically synchronous, the intermediate node may determine the packet of the last unicast media stream before transmission of the unicast media stream is stopped, and at this time, the intermediate node may determine the retransmission suppression information that needs to be generated, and the retransmission suppression information may be transmitted to the receiving node by using the extended RTCP packet at this moment or later according to the configuration. For example, the intermediate node may estimate the moment when the picture playing of the unicast media stream and the multicast media stream is basically synchronous according to the transmission speed of the unicast media stream and the multicast media stream, and sets certain redundancy according to the configuration, so as to determine the moment of stopping transmitting the unicast media stream. The intermediate node determines the retransmission suppression information that needs to be generated according to the packet of the last unicast media stream before the determined moment of stopping transmitting the unicast media stream, and the retransmission suppression information may be transmitted to the receiving node by using the extended RTCP packet at this moment or later according to the configuration.

In another specific application scenario of the embodiment illustrated in FIG. 6, when the picture playing of the unicast media stream and the multicast media stream is basically synchronous, the intermediate node may determine the packet of the last unicast media stream before rearrangement of the packet sequence numbers is stopped, and at this time, the intermediate node may determine the retransmission suppression information that needs to be generated, and the retransmission suppression information may be transmitted to the receiving node by using the extended RTCP packet at this moment or later according to the configuration. For example, when the picture playing of the unicast media stream and the multicast media stream is basically synchronous, the intermediate node stops discarding the packets of the unicast media stream, but continues to rearrange the packet sequence numbers, and the rearrangement of the packet sequence numbers is stopped after several packets according to the configuration. The intermediate node determines the retransmission suppression information that needs to be generated according to the determined moment when the rearrangement of the packet sequence numbers is stopped, and the retransmission suppression information may be transmitted to the receiving node by using the extended RTCP packet at this moment or later according to the configuration.

FIG. 7 is a schematic diagram of an extension manner of an extended RTCP packet according to another embodiment of the present invention, in which, "Type" is an adjustment type, "The Start Sequence Number" is the start sequence number of retransmission suppression, and "The End Sequence Number" is the end sequence number of the retransmission suppression.

When the method for suppressing lost packet retransmission provided in this embodiment is applied in the retransmission suppression of the fast channel change, the sequence numbers of packets requiring transmission are rearranged, and the retransmission suppression information is generated and transmitted, so that the receiving node does not request retransmission when the data packets requiring retransmission suppression are lost, thereby speeding up the picture display speed of the fast channel change, and increasing the number of users who can perform the fast channel change at the same time.

Another embodiment of the present invention is described in the following with reference to FIG. 8. In the embodiment of the present invention, the method for suppressing lost packet retransmission is specifically applied in retransmission suppression of intelligent discard.

During network congestion, in order to ensure the media quality and the user experience, some packets having small influence on the picture display may be selectively discarded. Therefore, the sequence numbers of a streaming media are made inconsecutive. In order to prevent the retransmission requested by the user due to inconsecutive sequence numbers, and to prevent the aggravation of the congestion, the method illustrated in FIG. 8 may be used.

FIG. 8 is a flow chart of a method for suppressing lost packet retransmission according to further another embodiment of the present invention, where the method includes the following steps:

Step 802: Discard packets having small influence on picture display in a media stream according to a packet discard policy.

Step 804: Rearrange sequence numbers of packets requiring transmission.

For example, when congestion occurs, a part of the packets are discarded according to the preset packet discard policy, for example, the packets N, N+a are discarded, and the packet sequence number N+1 in the original media stream is rearranged into the sequence number N, the packet sequence number N+2 in the original media stream is rearranged into the sequence number N+1, and so forth, the packet sequence number N+a+1 in the original media stream is rearranged into the sequence number N+a−1.

Step 806: Generate retransmission suppression information when it is not required to rearrange the sequence numbers of packets requiring transmission, in which the retransmission suppression information includes identification information of the data packets requiring retransmission suppression.

For example, when the congestion is relieved, the rearrangement of the packet sequence numbers is stopped, and the retransmission suppression information is generated for the inconsecutive packet sequence numbers. For example, before the congestion is relieved, the packets with the packet sequence numbers N, N+a, N+b, N+c are discarded, and when the packet with the packet sequence number N+d is transmitted, the rearrangement of the packet sequence numbers is stopped. The packet sequence number of the last packet transmitted before the rearrangement of the packet sequence number is stopped is rearranged into N+d−5, and the packet sequence number of the first packet transmitted after the rearrangement of the packet sequence number is stopped is N+d. Therefore, the retransmission suppression information is generated for the packets with the packet sequence numbers from N+d−4 to N+d−1. The retransmission suppression information includes the information of the section of the inconsecutive packet sequence numbers, such as the first packet sequence number (N+d−4) and the last packet sequence number (N+d−1) of the section of the inconsecutive packet sequence numbers.

Step 808: Transmit the retransmission suppression information to a receiving node, in which the retransmission suppression information is used to enable the receiving node not to request retransmission when data packets corresponding to the identification information in the retransmission suppression information are lost after the receiving node receives the retransmission suppression information.

For example, the retransmission suppression information may be transmitted to the receiving node by using an extended RTCP packet. For example, when the congestion is relieved, the rearrangement of the packet sequence numbers is stopped at this moment or later according to the configuration, and the retransmission suppression information is generated according to the determined moment when the rearrangement of the packet sequence numbers is stopped. The retransmission suppression information may be transmitted to the receiving node by using the extended RTCP packet.

When the method for suppressing the lost packet retransmission provided in this embodiment is applied in the retransmission suppression of the intelligent discard, the sequence numbers of packets requiring transmission are rearranged, and the retransmission suppression information is generated and transmitted, so that the receiving node does not request retransmission when the data packets requiring retransmission suppression are lost, thereby reducing the amount of the retransmission suppression information requiring transmitting, and the retransmission suppression information may be transmitted after the congestion is alleviated, thereby reducing the network burden, and avoiding the aggravation of the network congestion.

Another embodiment of the present invention is described in the following with reference to FIG. 9. In the embodiment of the present invention, the method for suppressing lost packet retransmission is specifically applied in SVC.

In the case that the SVC uses RTP single stream encapsulation, when the intermediate node performs adaptation on SVC video data, a part or all of the packets are extracted and forwarded to a receiving node. If a part of the packets are extracted, the RTP sequence numbers may be made inconsecutive, and the receiving node may consider that packet loss occurs in the RTP, and request retransmission accordingly. At this time, the embodiment illustrated in FIG. 9 may be used to suppress lost packet retransmission on the receiving node.

Figure 9:
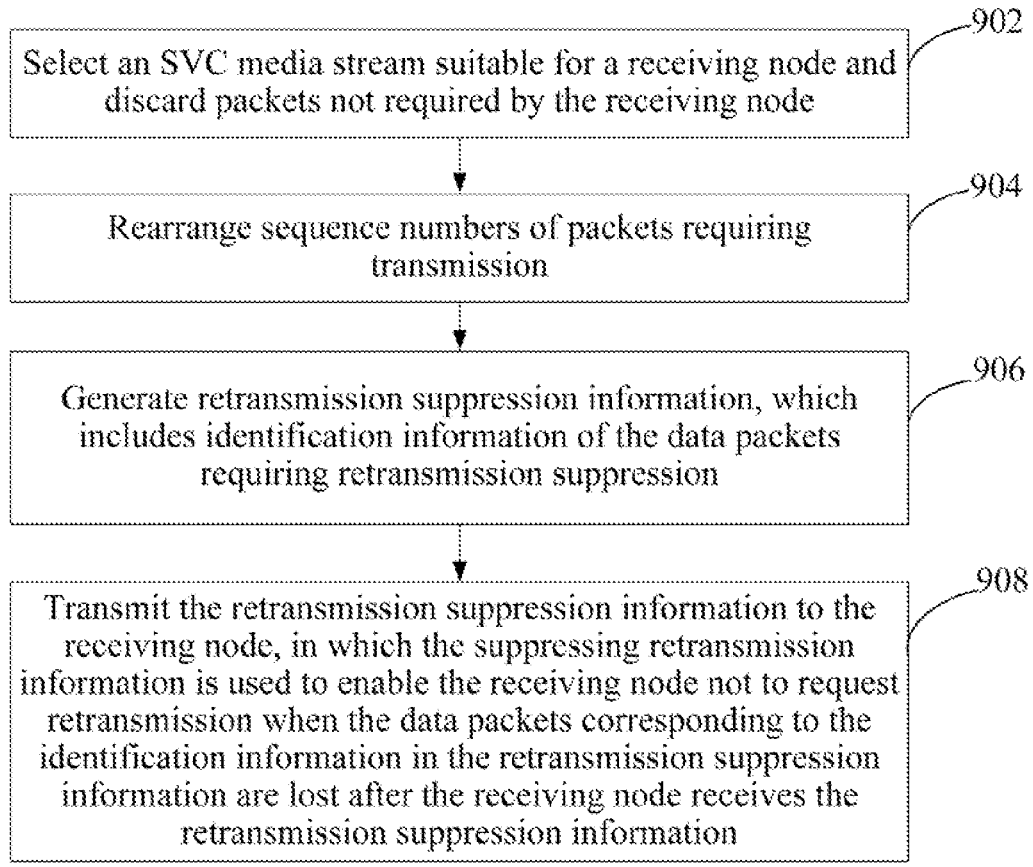
FIG. 9 is a flow chart of a method for suppressing retransmission of Scalable Video Coding (SVC) according to another embodiment of the present invention.

FIG. 9 is a flow chart of a method for suppressing retransmission of SVC according to another embodiment of the present invention, where the method includes the following steps:

Step 902: Select an SVC media stream suitable for the receiving node, and discard the packets not required by the receiving node.

Step 904: Rearrange the sequence numbers of packets requiring transmission.

For example, if the sequence numbers of the original packets are from 10001 to 10010, and a certain receiving node needs the packets with the original packet sequence numbers 10001, 10004, 10007, and 10010. After rearrangement, the sequence numbers of the packets transmitted to the receiving node by the intermediate node are 10001, 10002 (the original packet sequence number is 10004), 10003 (the original packet sequence number is 10007), and 10004 (the original packet sequence number is 10010).

Step 906: Generate retransmission suppression information when it is not required to rearrange the sequence numbers of packets requiring transmission, in which the retransmission suppression information includes identification information of the data packets requiring retransmission suppression.

For example, in the first specific application scenario of another embodiment of the present invention, the rearrangement of the original packet sequence numbers may be started periodically. For example, after the packets with the original packet sequence numbers from 10001 to 10010, the packets with the packet sequence numbers 10011, 10012 (the original packet sequence number is 10014), 10013 (the original packet sequence number is 10017), and 10014 (the original packet sequence number is 10020) are transmitted to the receiving node for the packets with the original packet sequence numbers from 10011 to 10020. At this time, in the packets transmitted by the intermediate node, the packets with the packet sequence numbers from 10005 to 10009 are not present, and therefore, the retransmission suppression information is generated for the packets with the packet sequence numbers from 10005 to 10009.

In a second specific application scenario of another embodiment of the present invention, the intermediate node reselects the SVC data suitable for the receiving node according to the requirements. For example, originally, the intermediate node transmits a base layer packet to the receiving node due to the network congestion, and after the network congestion is alleviated, the intermediate node changes to transmit all of the packets to the receiving node. For example, after the packets with the original packet sequence numbers from 10001 to 10010, the intermediate node changes to transmit all of the packets to the receiving node, and at this time, in the packets transmitted by the intermediate node, the packets with the packet sequence numbers from 10005 to 10009 are not present. Therefore, the retransmission suppression information is generated for the packets with the packet sequence numbers from 10005 to 10009.

Step 908: Transmit the retransmission suppression information to a receiving node, in which the retransmission suppression information is used to enable the receiving node not to request retransmission when data packets corresponding to the identification information in the retransmission suppression information are lost after the receiving node receives the retransmission suppression information.

For example, the retransmission suppression information may be transmitted to the receiving node by using an extended RTCP packet.

Another embodiment of the present invention is described in the following with reference to FIG. 10.

Figure 10:
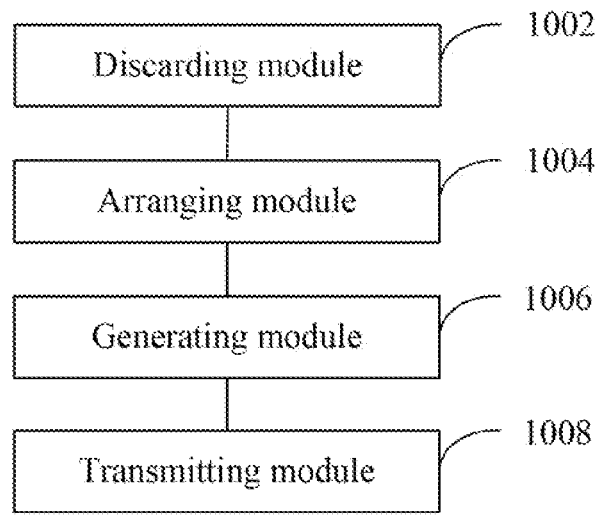
FIG. 10 is a schematic structural diagram of a network node according to another embodiment of the present invention.

FIG. 10 is a schematic structural diagram of a network node according to another embodiment of the present invention, where the network node includes a discarding module 1002, an arranging module 1004, a generating module 1006, and a transmitting module 1008.

The discarding module 1002 is configured to discard packets having small influence on picture display in a media stream according to a packet discard policy.

For example, the discarding module 1002 may discard the packets having small influence on picture display in a unicast media stream during fast channel change according to the packet discard policy, or discard the packets having small influence on picture display in a media stream according to the packet discard policy, or select SVC data suitable for the receiving node and discard the packets not required by the receiving node.

The arranging module 1004 is configured to rearrange sequence numbers of packets requiring transmission.

For example, the arranging module 1004 rearranges the sequence numbers of packets requiring transmission, so as to make the sequence numbers of packets requiring transmission consecutive.

The generating module 1006 is configured to generate retransmission suppression information when rearrangement is not required, in which the retransmission suppression information includes identification information of data packets requiring retransmission suppression.

The transmitting module 1008 is configured to transmit the retransmission suppression information generated by the generating module 1006 to a receiving node, in which the retransmission suppression information is used to enable the receiving node not to request retransmission when data packets corresponding to the identification information in the retransmission suppression information are lost after the receiving node receives the retransmission suppression information.

For example, the transmitting module 1008 may transmit the retransmission suppression information to the receiving node by using an extended RTCP packet.

All or a part of the technical solutions according to the embodiments of the present invention may be implemented through software programming, and the software program may be stored in a computer readable storage medium, such as a hard disk, an optical disk or a floppy disk of a computer.

The above descriptions are merely exemplary embodiments of the present invention, but are not intended to limit the present invention. Any modification, equivalent replacement, or improvement made without departing from the spirit and principle of the present invention should fall within the scope of the present invention.

What is claimed is:

1. A method for suppressing lost packet retransmission, comprising:
    generating retransmission suppression information, wherein the retransmission suppression information comprises identification information of data packets requiring retransmission suppression; and
    transmitting the retransmission suppression information to a receiving node by using an extended Real-time Transport Protocol (RTP) Control Protocol (RTCP) packet, wherein the retransmission suppression information is used to enable the receiving node not to request retransmission when data packets corresponding to the identification information in the retransmission suppression information are lost after the receiving node receives the retransmission suppression information;
    wherein the transmitting the retransmission suppression information to the receiving node by using the extended RTCP packet comprises:
    transmitting the extended RTCP packet using packet sequence numbers of a first packet and a last packet requiring retransmission suppression as the retransmission suppression information to the receiving node, when sequence numbers of packets requiring retransmission suppression are consecutive.

2. The method for suppressing lost packet retransmission according to claim 1, wherein the generating the retransmission suppression information comprises:
    generating the retransmission suppression information according to priorities of discarded data packets, and using the discarded data packets with low priorities as the data packets requiring retransmission suppression, wherein the retransmission suppression information comprises identification information of the discarded data packets with the low priorities.

3. The method for suppressing lost packet retransmission according to claim 1, wherein the transmitting the retransmission suppression information to the receiving node comprises:
    carrying the retransmission suppression information in a retransmission suppression message, a data packet, or a report packet to transmit to the receiving node, wherein the data packet is a data packet requiring retransmission suppression or a data packet not requiring retransmission suppression.

4. The method for suppressing lost packet retransmission according to claim 3, wherein the carrying the retransmission suppression information in the retransmission suppression message, the data packet, or the report packet to transmit to the receiving node comprises:
    carrying the retransmission suppression information in the retransmission suppression message, an extended retransmission suppression field of the data packet, or an extended retransmission suppression field of the report packet to transmit to the receiving node.

5. The method for suppressing lost packet retransmission according to claim 3, wherein when the data packet is a data packet requiring retransmission suppression, payload of the data packet is deleted, and the retransmission suppression information is carried in the data packet with the payload deleted.

6. The method for suppressing lost packet retransmission according to claim 1, wherein the retransmission suppression information comprises local retransmission suppression information and/or received retransmission suppression information.

7. The method for suppressing lost packet retransmission according to claim 1, wherein before the generating the retransmission suppression information, the method further comprises:
    discarding data packets according to a packet discard policy, and using the discarded data packets as the data packets requiring retransmission suppression.

8. The method for suppressing lost packet retransmission according to claim 7, wherein the discarding the data packets according to the packet discard policy comprises:
    discarding packets having small influence on picture display in a unicast media stream according to the packet discard policy during fast channel change; or
    discarding packets having small influence on picture display in a media stream according to the packet discard policy during network congestion; or
    selecting a Scalable Video Coding (SVC) media stream suitable for the receiving node and discarding packets not required by the receiving node when forwarding the SVC media stream.

9. A network node, comprising:
    a generating module, configured to generate retransmission suppression information, wherein the retransmission suppression information comprises identification information of data packets requiring retransmission suppression;
    a transmitting module, configured to transmit the retransmission suppression information generated by the generating module to a receiving node by using an extended Real-time Transport Protocol (RTP) Control Protocol (RTCP) packet, wherein the retransmission suppression information is used to enable the receiving node not to request retransmission when data packets corresponding to the identification information in the retransmission suppression information are lost after the receiving node receives the retransmission suppression information;

wherein the transmitting module, is configured to transmit the extended RTCP packet using packet sequence numbers of a first packet and a last packet requiring retransmission suppression as the retransmission suppression information to the receiving node, when sequence numbers of packets requiring retransmission suppression are consecutive.

10. The network node according to claim 9, wherein the generating module is specifically configured to generate the retransmission suppression information according to priorities of discarded data packets, and use the discarded data packets with low priorities as data packets requiring retransmission suppression, and the retransmission suppression information comprises identification information of the discarded data packets with the low priorities.

11. The network node according to claim 9, wherein the transmitting module is configured to carry the retransmission suppression information in a retransmission suppression message, a data packet, or a report packet to transmit to the receiving node, and the data packet is a data packet requiring retransmission suppression or a data packet not requiring retransmission suppression.

12. The network node according to claim 11, wherein when the data packet transmitted by the transmitting module is a data packet requiring retransmission suppression, payload of the data packet is deleted, and the retransmission suppression information is carried in the data packet with the payload deleted.

13. The network node according to claim 9, further comprising:
a receiving module, configured to receive retransmission suppression information transmitted from other network nodes; and
a collecting module, configured to collect the retransmission suppression information received by the receiving module and the retransmission suppression information generated by the generating module of the network node;
wherein the transmitting module is further configured to transmit the retransmission suppression information collected by the collecting module to the receiving node, the retransmission suppression information is used to enable the receiving node not to request retransmission when the data packets corresponding to the identification information in the collected retransmission suppression information are lost after the receiving node receives the collected retransmission suppression information.

14. The network node according to claim 9, further comprising:
a discarding module, configured to discard data packets according to a packet discard policy, and use the discarded data packets as the data packets requiring retransmission suppression.

15. A system for suppressing lost packet retransmission, comprising:
an intermediate node and a receiving node, wherein
the intermediate node is configured to generate retransmission suppression information and transmit the retransmission suppression information to the receiving node by using an extended Real-time Transport Protocol (RTP) Control Protocol (RTCP) packet, wherein the retransmission suppression information comprises identification information of data packets requiring retransmission suppression; and
the receiving node is configured to receive the retransmission suppression information transmitted from the intermediate node, and not to request retransmission when the data packets corresponding to the identification information in the retransmission suppression information are lost;
wherein the intermediate node, is configured to transmit the extended RTCP packet using packet sequence numbers of a first packet and a last packet requiring retransmission suppression as the retransmission suppression information to the receiving node, when sequence numbers of packets requiring retransmission suppression are consecutive.

16. The system for suppressing lost packet retransmission according to claim 15, wherein the intermediate node is further configured to collect the local retransmission suppression information and received retransmission suppression information, and transmit the collected retransmission suppression information to the receiving node.

17. The system for suppressing lost packet retransmission according to claim 15, wherein the intermediate node is further configured to generate the retransmission suppression information of lost data packets when it is determined that the retransmission suppression information of the lost data packets is not received, and transmit the retransmission suppression information to the receiving node.

18. The system for suppressing lost packet retransmission according to claim 17, wherein the intermediate node is further configured to request to retransmit the lost data packets, and transmit the lost data packets to the receiving node after receiving the lost data packets.

* * * * *